Aug. 30, 1966     Z. J. LANSKY ETAL     3,269,417
SOLENOID OPERATED VALVE
Filed Oct. 16, 1963

INVENTORS
ZDENEK J. LANSKY
KURT W. LEIBFRITZ
BY
John N. Wolfram
ATTORNEY

United States Patent Office 3,269,417
Patented August 30, 1966

3,269,417
SOLENOID OPERATED VALVE
Zdenek J. Lansky, Winnetka, and Kurt W. Leibfritz, Norridge, Ill., assignors to Parker-Hannifin Corporation, Cleveland, Ohio, a corporation of Ohio
Filed Oct. 16, 1963, Ser. No. 316,722
13 Claims. (Cl. 137—625.64)

This invention relates to solenoid operated valves.

An object of the invention is to provide a solenoid operated valve in which a valve member movable by a solenoid to a position where it closes a passage in the valve housing is also movable to this position by a manually operated valve which at the same time opens another fluid passage in the housing.

It is another object to provide a solenoid operated valve in which a valve member is movable by a solenoid to a position where it closes an exhaust passage in the valve housing, and in which the valve member is also movable to such position by a manually operated valve member which at the same time opens a supply passage in the valve housing.

It is another object of the invention to provide a fluid pressure operated main valve controlled by a pair of solenoid operated pilot valve members, each of the latter being also movable by a manually operated valve member.

It is another object to provide a fluid pressure operated main valve controlled by a pair of solenoid operated pilot valves, in which the solenoid valves are side by side and the pilot valve housing provides a common flux path for the two solenoids.

Figure 1:
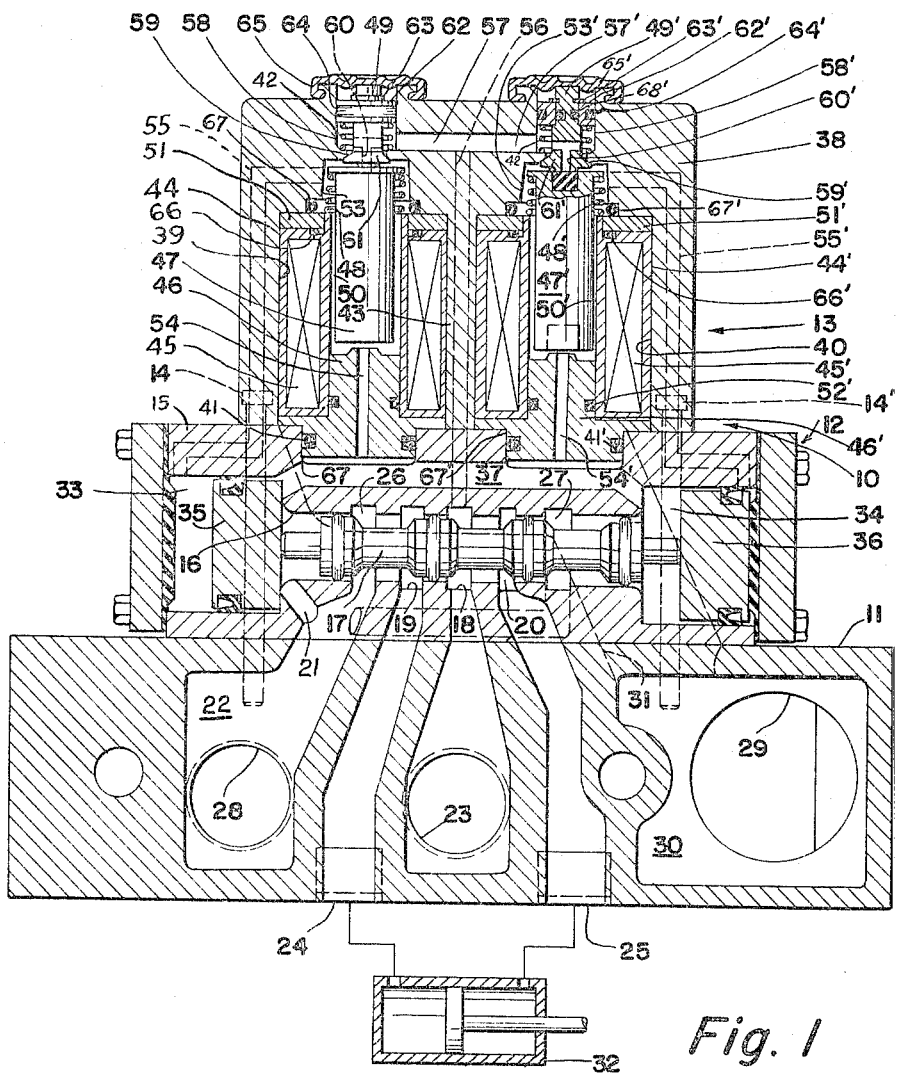
Figure 2:
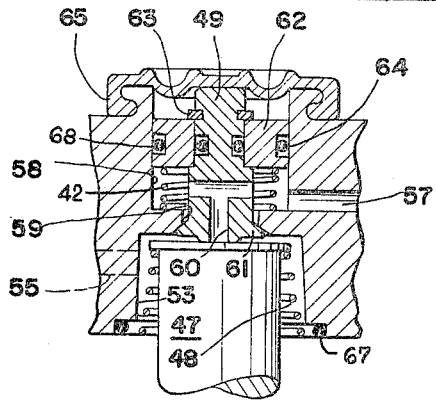

Other objects of the invention will be apparent from the following description and from the drawings in which:

FIG. 1 is a vertical cross section view of a solenoid operated pilot valve controlled main valve in accordance with the present invention, and FIG. 2 is an enlarged fragmentary cross section view of a portion of one of the pilot valves.

The valve assembly generally designated at 10 includes a manifold block 11, a main valve section 12 and a pilot valve section 13, these sections being attached to each other and to block 11 by bolts 14, 14'.

Main valve section 12 has a main valve housing 15 in which there is a valve bore 16 containing a main valve element 17. Intersecting bore 16 are main pressure passage 18, and motor passages 19 and 20 which connect with inlet and motor ports 23, 24 and 25, respectively in block 11. Motor ports 24, 25 in turn may be connected to a fluid pressure motor 32 whose operation is to be controlled by the valve assembly.

Also intersecting bore 16 are main exhaust passages 26, 27 which connect with main exhaust passage 22 and exhaust port 28 in block 11. There is also an opening 29 and a chamber 30 in block 11 connected to a passage 31 through housing 15 through which electrical wires for connection to the solenoids may be run.

Housing 15 has working chambers 33, 34 in which pistons 35, 36 are respectively mounted. A main exhaust passage 37 connects the inner ends of the working chambers 33, 34 and is connected to exhaust port 28 via the inner end of chamber 33 and main exhaust passages 21, 22.

Pilot valve section 13 includes a body 38 having a pair of side by side cylindrical bores 39, 40 therein and separated by a central section 43 of body 38. Mounted in bores 39, 40 are identical solenoid operated pilot valves generally designated 44, 44' which include solenoid coils 45, 45', seat members 46, 46', armatures 47, 47' which serve as solenoid operated valve elements and springs 48, 48' which normally urge the armatures to an upward position away from contact with seat members 46, 46' and into contact with manually operable valve elements 49, 49'. At the upper ends of coils 45, 45' are washers 51, 51' of magntizable material.

Central openings 50, 50' in the solenoid coils are open to counter bores 53, 53' in body 38 and with such counter bores define pilot valve chambers. O-ring packings 52, 52' seal seat members 46, 46' within solenoid coils 45, 45'.

Seat members 46, 46' have their lower ends sealed within openings 67, 67' in housing 15 by packings 41, 41' and have exhaust passages 54, 54' therethrough which connect openings 50, 50' with passage 37. Work passages 55, 55' connect counter bores 53, 53' with working chambers 33, 34, respectively. An inlet passage 56 connects main pressure passage 18 with inlet branch passages 57, 57' which lead to counter bores 58, 58' in housing 38, and supply passages 59, 59' connect counter bores 58, 58' to counter bores 53, 53'. Valve elements 49, 49' have supply passages 60, 60' therein for connecting counter bores 58, 58' with counter bores 53, 53', such supply passages 60, 60' constituting a first flow path between such counter bores and the supply passages 59, 59' constituting a second flow path between such counter bores.

Valve elements 49, 49' have heads 61, 61' for closing supply passages 59, 59' and have pistons 62 and 62' secured thereto by snap rings 63, 63'. Pistons 62, 62' are sealed within counter bores 58, 58' by packings 64, 64' and are sealed relative to valve elements 49, 49' by O-ring packings 68, 68'. Elastic diaphragms 65, 65' are secured to housing 38 and close counter bores 58, 58'. O-ring packings 66, 66' seal washers 51, 51' relative to solenoid coils 45, 45'. O-ring packings 67, 67' seal washers 51, 51' relative to housing 58.

In operation, fluid under pressure is introduced through inlet port 23 and has access to passages 18, 56, 57, 57', counter bores 58, 58' and supply passages 60, 60'. With main valve element 17 in the position shown, pressure fluid from main pressure passage 18 passes through valve bore 16 into motor passage 20 and through motor port 25 to one end of motor 32. At the same time, fluid from the opposite end of motor 32 is returned through motor port 24, passage 19, motor bore 16 and main exhaust passage 26 to exhaust port 28. At this time solenoid coils 45, 45' are in a deenergized condition, fluid pressure within counter bores 58, 58' acts upwardly on pistons 62, 62' to keep supply passages 59, 59' closed by valve heads 61, 61'. Also, springs 48, 48' keep valve elements 47, 47' in an upward position against heads 61, 61' for closing off supply passages 60, 60' from counter bores 53, 53' and for spacing the lower ends of valve elements 47, 47' from seat members 46, 46' whereby the outer ends of working chambers 33, 34 are open to main exhaust passage 37 via work passages 55, 55', counter bores 53, 53', openings 50, 50' and exhaust passages 54, 54'.

If solenoid coil 45' is now momentarily energized, valve element 47' will be pulled downwardly by magnetic force to close exhaust passage 54' and to open supply passage 60' to counter bore 53', thus allowing pressure fluid from counter bore 58' to pass through supply passage 60', counter bore 53' and work passage 55' to the counter end of working chamber 34 to move piston 36 and main valve element 17 to the left so as to connect pressure passage 18 with motor passage 19 and to connect motor passage 20 with main exhaust passage 27 for reversing the operation of motor 32. Movement of main valve element 17 to the left also moves piston 35 to the left, this piston having exhaust pressure on both sides thereof at this time.

Upon deenergizing of coil 45', valve element 47' will return to the position illustrated under the action of spring 48' for again connecting the outer end of working chamber 34 to main exhaust passage 37 via work passage 55', counter bore 53', opening 50', and exhaust passage 54', and at the same time to close supply passage 60'. If solenoid coil 45 is now momentarily energized, valve element 47 will move down to close exhaust passage 54 and to open supply passage 60 so that pressure fluid from counter bore 58 may pass therethrough into counter bore 53 and work passage 55 to the outer end of working chamber 33 to move piston 35, main valve element 17, and piston 36 rightward to the position shown, and likewise when solenoid 45 is deenergized valve element 47 will be moved upward by spring 48 to its position as shown.

In the event it is desired to shift main valve element 17 to the left without energizing solenoid coil 45', the center portion of diaphragm 65' may be depressed manually to move valve element 49' downwardly so that head 61' uncovers supply passage 59' to connect counter bore 58' with counter bore 53' and thus allow pressure fluid to pass from counter bore 58' through work passage 55' to the outer end of working chamber 34 for moving piston 36, main valve element 17 and piston 35 to the left. At the same time, valve element 49' moves valve element 47' down into engagement with seat member 46' to close off exhaust passage 54'. Upon release of diaphragm 65' valve element 49' will be moved upwardly by the combined action of fluid pressure within counter bore 58' acting upwardly on piston 62' and the action of spring 48' transmitted through valve element 47' to the lower side of valve element 49', as well as the action of spring 42' pressing on piston 62'. The net fluid pressure force acting upwardly on piston 62' is that acting on the area of the lower face 69' of piston 62' less that acting downwardly on valve head 61' and the small shoulder 70' of valve element 49' against which the lower face 69' of piston 62' rests.

In like manner, piston 35, main valve element 17 and piston 36 may be moved to the right by manually depressing valve element 49 to unseat valve head 61 to move valve element 47 downwardly to close off exhaust passage 54. When valve element 49 is released, it likewise returns to its closed position by the action of fluid pressure upon piston 62 and the actions of spring 48 transmitted through valve element 47 and of spring 42 on piston 62.

If desired, inlet passage 56 may be connected to main exhaust passage 37 instead of main pressure passage 18 and exhaust passages 54, 54' may be connected to main pressure passage 18 instead of main exhaust passage 37. With this arrangement, the outer ends of working chambers 33, 34 will be connected to pressure when the pilot valves are in the positions shown, and the outer end of chamber 34 will be connected to exhaust when either solenoid 45' is energized or valve element 49' depressed and the outer end of working chamber 33 will be connected to exhaust when either solenoid coil 45 is energized or valve element 49 is depressed.

Although only one form of the invention is illustrated, it is obvious that various modifications may be made therein within the scope of the invention as defined by the claims.

We claim:

1. A solenoid operated valve assembly comprising a main valve housing having a plurality of main fluid flow passages and a fluid pressure operated valve member controlling flow of fluid between said main passages, a pilot valve housing attached to the main housing, pilot passages in said housings alternately admitting and exhausting fluid under pressure to and from opposite ends of said main valve member for moving said main valve member, a pair of solenoids in said pilot valve housing, each solenoid in operative relation with a separate pilot valve each said separate pilot valve defining means for controlling flow of fluid through said pilot passages, means establishing a path for flux between the ends of each solenoid when the solenoid is energized said pilot valve housing having a portion thereof between the solenoids providing a portion of said flux path that is common to the two solenoids.

2. In a valve, a body having two supply passages in communicating relation with a work passage, a first valve element near one of said supply passages, operable for opening and closing one of said supply passages relative to the work passage, a solenoid in operative relation with said first valve element, a second valve element near the second of said supply passages operable for opening and closing the second supply passage relative to the work passage, and means on said second valve element whereby the same may be manually operated.

3. The valve of claim 2 in which the two supply passages branch from a common inlet passage.

4. The valve of claim 2 in which the first supply passage passes through the second valve element.

5. The valve of claim 4 in which the first valve element engages the second valve element for closing the supply passage therein.

6. The valve of claim 2 in which the second valve element has means thereon subject to pressure of fluid in said second supply passage to urge the second valve element toward its closed position.

7. The valve of claim 2 in which the first supply passage element passes through the second valve element and there is a spring urging the first valve element into engagement with the second valve element for closing the supply passage therein when the solenoid is not energized.

8. The valve of claim 2 in which there is a counterbore in said body upstream of said supply passages and communicating therewith, said counterbore being open to the exterior of the body, said second valve element has a portion within the counterbore extending to said opening, a piston attached to said portion and subject to fluid pressure within the counterbore for urging the second valve element toward its closed position, and an elastic member closing said counterbore opening, said elastic member being exposed for manual manipulation against said second valve element portion for moving the second valve element to its open position.

9. In a valve, a body having first and second supply passages in communicating relation; a work passage and an exhaust passage, a first valve element adjacent the first supply passage for alternately opening and closing the exhaust passage and the first supply passage relative to the work passage, a solenoid in operative relation with the first valve element, a second valve element adjacent the second supply passage for opening and closing the second supply passage relative to the work passage, means on the second valve element whereby the same may be operated, said second valve element defining means for operating said first valve element to its position for closing the exhaust passage when the second valve element is operated to its position for opening the second supply passage.

10. The valve of claim 9 in which the second supply passage passes through the second valve element and is closed by contact of the two valve elements.

11. The valve of claim 9 in which the second valve element has a head at one end engageable with a seat surrounding the second supply passage for closing the same and has a piston at its other end larger in diameter than the contact diameter between said head and said seat whereby fluid pressure within said second supply passage acting on both said head and piston exerts a greater force on the piston than on said head for normally urging the second valve element to its closed position.

12. A valve assembly comprising a valve housing having a plurality of main passages and a main valve element in operative relation with said passages and having means thereon for controlling flow of fluid between selected ones of said main passages, first and second working chambers in communicating relation with said passages, pistons in each chamber responsive to fluid pressure therein for operating said main valve elements, two sets of passages adjacent each of said chambers for directing and exhausting fluid to each chamber for activating said means, each of said sets of passages including first and second supply passages for supplying fluid to the respective chamber, control means in operative relation with each of said sets of passages, each control means including a first valve element for opening and closing the first supply passage of the respective set, each control means also including a second valve element for opening and closing the second supply passage of the respective set, a solenoid in operative relation with each of said first valve elements, and means on each of said second valve elements whereby said second pilot valve elements may be manually operated.

13. The valve assembly of claim 12 in which the two supply passages of each set are connected to a common inlet passage.

References Cited by the Examiner
UNITED STATES PATENTS

| | | | |
|---|---|---|---|
| 2,630,828 | 3/1953 | Bent | 137—625.64 |
| 2,836,196 | 5/1958 | Gunn | 137—625.64 |
| 3,084,676 | 4/1963 | Herion et al. | 137—625.64 X |

M. CARY NELSON, *Primary Examiner.*

H. T. KLINKSIEK, *Assistant Examiner.*